United States Patent
Braun et al.

(12) 
(10) Patent No.: US 6,623,226 B2
(45) Date of Patent: *Sep. 23, 2003

(54) ASSEMBLY UNIT INCLUDING A COMPONENT AND AT LEAST ONE SCREW

(75) Inventors: Mario Braun, Mücke (DE); Wolfgang Sommer, Gemünden/Wohra (DE); Frank Wagner, Grossen Buseck (DE)

(73) Assignee: Kamax-Werke Rudolf Kellermann GmbH & Co. KG, Osterode am Harz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/061,838

(22) Filed: Feb. 1, 2002

(65) Prior Publication Data

US 2002/0106257 A1 Aug. 8, 2002

(30) Foreign Application Priority Data

Feb. 2, 2001 (DE) .......................... 101 04 672

(51) Int. Cl.⁷ ............................ F16B 21/18; F16B 39/00
(52) U.S. Cl. ..................... 411/353; 411/107; 411/542; 411/970; 411/999
(58) Field of Search ................. 411/107, 352, 411/353, 542, 970, 999, 907

(56) References Cited

U.S. PATENT DOCUMENTS

| | | | |
|---|---|---|---|
| 5,094,579 A | * 3/1992 | Johnson | 411/353 X |
| 5,255,647 A | * 10/1993 | Kiczek | 411/353 X |
| RE36,164 E | * 3/1999 | Johnson et al. | 411/970 X |
| 6,059,503 A | * 5/2000 | Johnson | 411/353 |
| 6,379,093 B1 | * 4/2002 | Bondarowicz et al. | 411/353 |
| 6,478,519 B1 | * 11/2002 | Genick, II | 411/353 |

FOREIGN PATENT DOCUMENTS

| | | |
|---|---|---|
| DE | 195 46 072 C2 | 6/1997 |
| DE | 196 51 838 A1 | 6/1997 |
| EP | 0 942 164 A2 | 2/1999 |
| WO | WO 95/21335 | 8/1995 |

OTHER PUBLICATIONS

European Search Report, Feb. 6, 2003, 3 pages.

* cited by examiner

*Primary Examiner*—Neill Wilson
(74) *Attorney, Agent, or Firm*—Thomas, Kayden, Horstemeyer & Risley LLP

(57) ABSTRACT

An assembly unit includes at least one component and at least one screw including a shank having an outer diameter and at least partially including a thread. The head of the screw is designed and arranged to rotate the screw. A supporting surface of the screw faces the component. The component for each screw includes a through hole having a diameter. At least one bush is associated with the at least one screw, and it is designed and arranged to be insertable into the respective through hole. The bush is made of plastic material, and it is designed and arranged to be fixedly connected in the through hole resulting in elastic deformation of the bush. The inner diameter of the bush is slightly more than the outer diameter of the shank. The supporting surface is designed and arranged to operatively contact the component after assembly without contacting the bush to transmit an axial force. The bush, the screw and the component are designed and arranged to be captively connected.

17 Claims, 7 Drawing Sheets

ASSEMBLY UNIT INCLUDING A COMPONENT AND AT LEAST ONE SCREW

CROSS REFERENCE TO RELATED APPLICATIONS

This application claims the benefit of co-pending German Patent Application No. 101 04 672.3-12 entitled "Montageeinheit aus einem Bauteil und mindestens einer Schraube", filed on Feb. 2, 2001.

FIELD OF THE INVENTION

The present invention generally relates to an assembly unit including a component and at least one screw. More particularly, the present invention relates to an assembly unit including a bush being made of plastic material.

Generally, assembly technology increasingly requires assembly units in which a plurality of components forms a pre-assembled unit. The assembly unit including a component and usually a plurality of screws is then connected to a work piece. As a typical example for this technology, an upper element and a lower element have to be connected by one or more screws. The upper element as the component and the plurality of screws are combined to form a pre-assembled assembly unit to which the screws are captively connected. The assembly unit is then connected to the lower element by tightening the screws one after the other or simultaneously, especially with the use of a multi-spindle automatic screwing apparatus. Such assembly units are typically used in the production of automobiles. For example, the cast cover of a cast housing—which for example is made of plastic, aluminum or magnesium—or a cover of a transmission forms the component which is to be connected with the work piece by screws. In this case, the work piece means the housing and the housing of the transmission, respectively. Realizing such assembly units allows for a great level of pre-manufacture. The screws are already located at the component in a captive, aligned and pre-assembled way. During transportation, they are safe from being damaged, and they allow for fast connection with the work piece.

BACKGROUND OF THE INVENTION

An assembly unit is known from International Application WO 95/21335. The known assembly unit includes a component, for example a cover of a housing, and at least one fixing element in the form of a screw. A third element is associated with each screw. This third element is a bush which is used to capture the screw. The bush is made of metal, especially of sheet metal. The bush increases the cost of manufacture of the known assembly unit. The bush is pressed into a respective through hole being located at the component which requires a separate pre-assembly step. The bush is fixed in the through hole of the component due to frictional engagement. The bush has a structural height which is a multiple of the structural height of the component in the region of the through hole. The screw itself also has a respective complicated shape and a great axial length. A ring flange is located in the region of the shank of the screw, the ring flange including ring channels at both sides. The ring flange has to be produced at the shank of the screw in addition to the thread. The size of the ring flange is coordinated with the size of a collar being located at the bush in a way that an axial lock is formed, the axial lock still allowing for a respectively great axial movement in a certain region of movement in a way that the screws in the pre-assembled position are located to be captive, but not fixed at the component. There also is the possibility of not arranging a ring flange at the screw. In this case, special elements have to be arranged at the bush, the elements in combination with the screw forming an axial lock. Consequently, the bush gets a more complicated design. In this case, the thread of the screw may fulfill part of the axial lock. There only is a relation between the diameter of the through hole being located in the component and the diameter of the shank of the screw in a way that the screw together with the bush pass through the through hole and have to be inserted into the through hole, respectively. However, exact axial alignment of the screw at the component does not take place since the screw is arranged to be only movable to a limited extent. This fact may be advantageous for screwing the screw into the work piece if it is ensured that the screw finds the entrance into the thread being located into the work piece in a centered way. Due to the possibility of tilting the axes of the screws with respect to one another, entrance of the free end of the shank into the thread in the work piece may only be realized to some limited extent. These disadvantages may be counteracted by the bush as third component within the assembly unit having a relatively great axial length. Especially, it may be designed to be substantially longer than the thickness of the wall of the component. Due to the length of the bush, the length of the screw also has to be increased. As a result, not only costs are increased, but in some cases there is a negative effect on function. Using such bushes in assembly units including at least three single elements is disadvantageous since the bush is subjected to tension while the screw is being screwed into the work piece. In case the bushes are made of comparatively thin deformable sheet metal, there even is the danger of different deformations of the bushes occurring during tightening of the screws in a way that it is only possible to apply reproducible pre-tensioning forces to a limited extent.

German Patent Application No. 196 51 838 A1 shows a component being made of plastic material, the component being designed to be connected to a work piece by screws with an intermediate arrangement of a seal. A bush being made of a metallic material, protruding through the component and being connected to the seal is used. The screw has to include a separately produced ring flange which cooperates with the bush in the sense of an axial lock. In this way, the screw is arranged in a lose, but captive way at the bush. The bush is a third element of the assembly unit in addition to the component and to the screw. The bush does not necessarily have to extend through the entire through hole in the component.

German Patent No. 195 46 072 C2 shows a bush having a shorter axial length and including a conical collar only partly engaging a partially conical through hole in the component under frictional engagement. The captive arrangement is realized by frictional forces in a way that the construction is respectively unsafe. The bush being designed in the form of a disc finally is located between the supporting surface at the head of the screw and the respective counter surface at the component. In this way, the bush is clamped, and there generally are similar disadvantages, as this has been described above.

SUMMARY OF THE INVENTION

The present invention generally relates to an assembly unit. More particularly, the present invention relates to an assembly unit including at least one component and at least one screw including a shank having an outer diameter and at least partially including a thread. The head of the screw is designed and arranged to rotate the screw. A supporting surface of the screw faces the component. The component for each screw includes a through hole having a diameter. At least one bush is associated with the at least one screw, and it is designed and arranged to be insertable into the respective through hole. The bush is made of plastic material, and it is designed and arranged to be fixedly connected in the through hole resulting in elastic deformation of the bush. The inner diameter of the bush is slightly more than the outer diameter of the shank. The supporting surface is designed and arranged to operatively contact the component after assembly without contacting the bush to transmit an axial force. The bush, the screw and the component are designed and arranged to be captively connected.

The novel assembly unit is also suitable for screws which do not produce a thread, for example screws having a metric thread, and in which the respective bush of the pre-assembled assembly unit is not located in the force flux while the screw is screwed into the work piece. Furthermore, the screw and the screws, respectively, are captively connected to the component in the pre-assembled position. To be captively connected is to be understood as being connected in a way that the screw is detachable from the component, but it cannot get lost unintentionally.

The novel assembly unit includes a bush being made of plastic material instead of metallic material. The bush may be produced in a simple fashion as a preform element. The bush is connected in the through hole of the component under elastic deformation with frictional engagement and/or with form fit. Frictional engagement is also to be understood as force connection which, for example, is effected by a micro-encapsulated glue applied onto the outer surface area of the bush or onto the cylindrical surface of the through hole in the component. The through hole may be designed as a simple bore. The inner diameter of the bush is only slightly greater than the outer diameter of the thread of the screw. The screw only contacts the bush in the region of a collar protruding towards the inside. The screw is centrically guided by the length of the bush. Assembly of the screw and of the bush advantageously acquires low assembly forces. Pre-assembly may be well automatized since simple pressing of the screw with respect to the bush is only necessary without any turning movement or locking movement. The screw may be pressed into the bush being located in the component. However, it is also possible to first push the bush onto the screw and to then introduce the bush into the component. Due to the use of the bush being made of plastic material, there is no danger of contact corrosion, as it occurs between a bush being made of steel and a component being made of magnesium.

The novel assembly unit includes one or more screws which may also have a metric thread. However, it is also possible to use screws which form or produce a thread, preferably screws which produce a thread during screwing without producing chips. There is a certain relation between the diameter of the through hole being located in the component, the bush which is to be arranged in the through hole and the size of the screw, especially in the region of its shank including a thread. In this way, the screw extends through and engages the through hole, respectively, after pre-assembly. Thus, not only the axial lock between the collar and the thread is realized, but also alignment of the axis of the screw and of the component, the alignment being sufficient for centering and resulting from the coordination of the inner diameter of the bush with respect to the outer diameter of the thread in the section of the shank. The alignment of the axis of the screw is determined in this way, and the screw may easily find the hole, especially the threaded hole, in the work piece. In case the screw only partly protrudes into the bush being located in the through hole, the thread of the screw is partly located in the region of the bush and partly at the side of the screw facing the head outside the through hole. In this way, the thread is located in a safe position during transportation from the manufacturer of the pre-assembled assembly unit to the place where the assembly unit is further used such that damages are not to be expected. The screw or the screws are located with aligned axes in the respective bushes (and these in the through holes). As a result, function is improved and a captive arrangement is realized.

Usually, the supporting surface being located at the screw and serving to transmit the axial force is designed to directly contact the component without contacting the bush. Especially, the application and effect of the axial force is not negatively influenced in the tightened position of the screw. The bush is made of plastic material, and it is not loaded by the thread of the screw when the screw is screwed into the work piece. The bush in the tightened position of the screw remains free from any axial force such that negative setting effects in combination with decreasing pre-tension are not to be expected. However, to attain a sealing effect between the work piece, the component and the head of the screw, it may make sense to size the bush in a way that a limited axial force being necessary to attain the sealing effect is transmitted by the bush. However, these axial forces are comparatively low such that no setting effects are to be expected in such a case.

It is also possible to chose a design in which the supporting surface being located at the screw indirectly contacts the component to transmit the axial force with or without using contact with the bush. In this case, a fourth element per screw is added to the novel assembly unit. This fourth element is a supporting disc at one side being supported at the component and at its other side being supported at the supporting surface being located at the head of the screw. The supporting disc may have Z-like cross section. This design is especially advantageous in case great supporting surfaces between the component and the supporting disc are required to maintain defined surface pressure. The use of a supporting disc allows for realizing comparatively great diameters of the supporting surface on the component, these great diameters in case of an integrated design, for example in case of a collar screw, being hard to be produced and making no economical sense. In case of using the supporting disc, there is the further advantage of a comparatively small head frictional moment occurring during tightening of the screw. On the other hand, the supporting disc may also be designed as one piece with the screw, meaning it may be integrated into the head of the screw.

It may make sense that the screw in the region of its shank close to the supporting surface includes a ring groove which forms an undercut. The ring groove has a diameter which is less than the inner diameter of the bush and an effective axial length which is more than the length of the bush. Especially when a plurality of such screws is to be located in the pre-assembled position of the component in a way that it is designed for multiple screw connections with the work piece, it is of importance that the screw in the region of the shank between the supporting surface at the head and the threaded portion includes a ring groove forming an undercut. The diameter of the ring groove is less than the inner diameter of the bush, and its axial length is more than the axial length of the through hole in the component taking the respective transition radiuses into account. Due to the arrangement of the screw, the axial lock and the alignment of the axis as well as the captive arrangement of the mounted assembly unit are reached in the pre-assembled unit. On the other hand, the screw and the screws, respectively, in the region of the ring channel forming the undercut gets free from the bush being located in the component in a radial and in an axial direction such that there is an adaptation of the screw or the screws at the work piece taking When a plurality of screws is used, a possible clamping effect of the component at the work piece is also prevented. Consequently, the component reaches a free relative position with respect to the work piece. This adaptation may also be used when the screws are screwed into the work piece one after the other. The same applies when a plurality of screws or all screws are screwed into the work piece simultaneously. In this case, it is especially advantageous to use screws which produce a thread, and not to arrange threads in the bores in the work piece which are engaged by the screws. Instead, the bores may be designed as cast bores or cut bores. Then, it is not necessary to produce threads in the work piece during its manufacture. Instead, the screw produces the thread. When respective tolerances are met, it is also possible to connect the pre-assembled assembly unit including the component and the screws with a work piece the bores of which are associated with the screws and already include threads. This applies no matter whether a plurality of screws is simultaneously screwed into the work piece or one after the other. The use of bushes being made of resilient plastic material is advantageous.

The bush at its end portion facing the head of the screw may include a collar protruding towards the outside, the collar forming a stop during insertion of the bush into the through hole. In this way, the bush is prevented from being pressed too deeply into the component and into the work piece. In combination with this arrangement, the screw includes a continuous depression being designed as an avoiding channel and being located close to the supporting surface to prevent clamping of the material of the bush during tightening of the screw. The depression is designed and arranged to accept the collar protruding towards the outside. Usually, the height of the depression or deepening is more than the height of the collar of the bush. In such a case, the bush remains totally free from an axial force of the screw. In case the height of the deepening is less than the height of the collar of the bush, part of the axial force is consumed by clamping the collar of the bush. Even in this case, the essential and greater part of the bush remains free from the effect of an axial force.

The bush may be designed to be fixedly arranged in the through hole of the component due to frictional engagement and/or due to form fit. In this way, the bush is securely held in the through hole of the component, especially in a way that it cannot be rotated. Fixing the bush in the through hole of the component due to frictional engagement and/or due to form fit may be achieved by the application of glue onto the outer surface of the bush. Advantageously, micro-encapsulated glue is used for this purpose, the gluing effect of such glue starting when the bush is pressed into the through hole of the component. The through hole in the component and/or the outer diameter of the bush may also have an unround design. For example, it may be designed as a polygon including a radial protrusion, to have an oval cross section, as a square or the like. The fixed connection due to frictional engagement is realized by a respective size and by respective pressing the bush into the through hole. This may be achieved in different ways. The bush may be arranged in the through hole with an excess or with a surplus excess at both sides, at one side or without an excess.

The bush may have a greater structural height than the component in the region of the through hole. The bush at its side facing the head of the screw may include a collar protruding beyond the through hole in a radial direction or respective protrusions which limit the capability of pressing the bush into the through hole of the component. The collar and the protrusions form a stop when the screw is screwed in, and they prevent the bush from being pushed out off the through hole. Even without a collar and protrusions, the bush at least at its side facing the head of the screw outside the height of the component in the region of the through hole may be designed to be expandable by screwing in the screw. Consequently, the excess of the bush extending in an outward direction forms a stop protruding in a radial direction when the screw is screwed in. The bush may include a plurality of protrusions being designed to be elastically deformed, the protrusions being arranged to face towards the inside. The inwardly protruding protrusions of the bush may include a chamfer to simplify insertion of the screw.

The thread being located at the shank of the screw may have an axial length which is less than the thickness of the component. In this way, there is the possibility of the screw being securely located within the bush during transport of the pre-assembled unit such that there is no danger of damages.

The screw at the free end of its shank may include a centering portion without a thread, the centering portion having an outer diameter being less than the inner diameter of the bush. The centering portion is advantageous when the screw is inserted into the bush and when the screw is screwed into the threaded hole or the thread in the work piece.

The deepening next to the supporting surface may have an axial length which is less than the axial length of the collar of the screw such that a sealing effect is attained in the tightened position of the assembly unit. Only a small part of the axial force of the screw is necessary for pressing the collar of the bush in an axial direction to attain the sealing effect. The greater part of the bush also remains free from forces.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
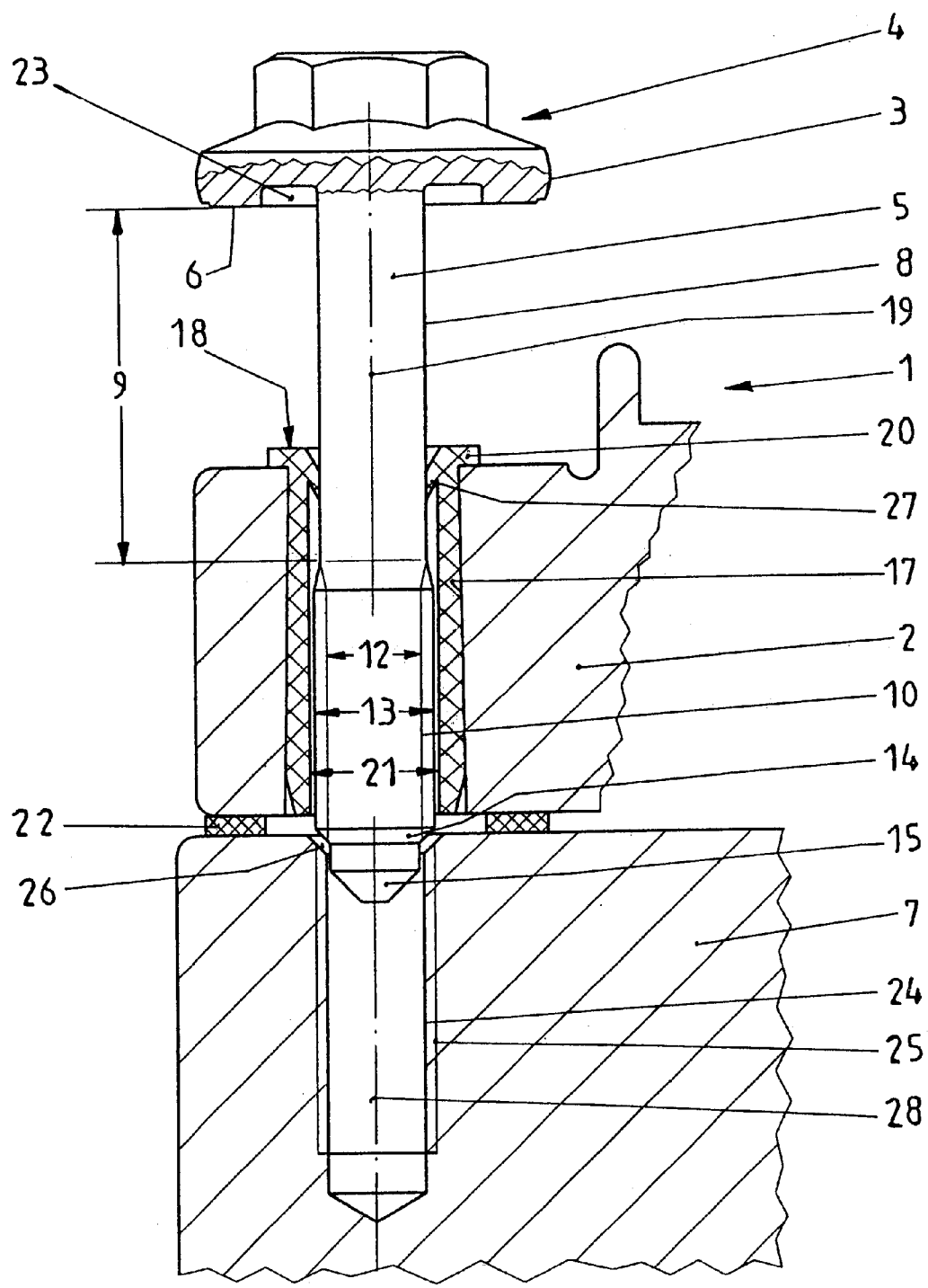
FIG. 1 is a sectional view of a first exemplary embodiment of the novel assembly unit while getting in contact with a work piece.

Referring now in greater detail to the drawings, FIG. 1 illustrates a part of a novel assembly unit 1. The assembly unit includes a component 2 and at least one screw 3. All the drawings only illustrate one screw 3 in combination with one component 2. It is to be understood that especially a plurality of screws 3 is connected to a component 2 in a spaced apart manner.

Figure 4:
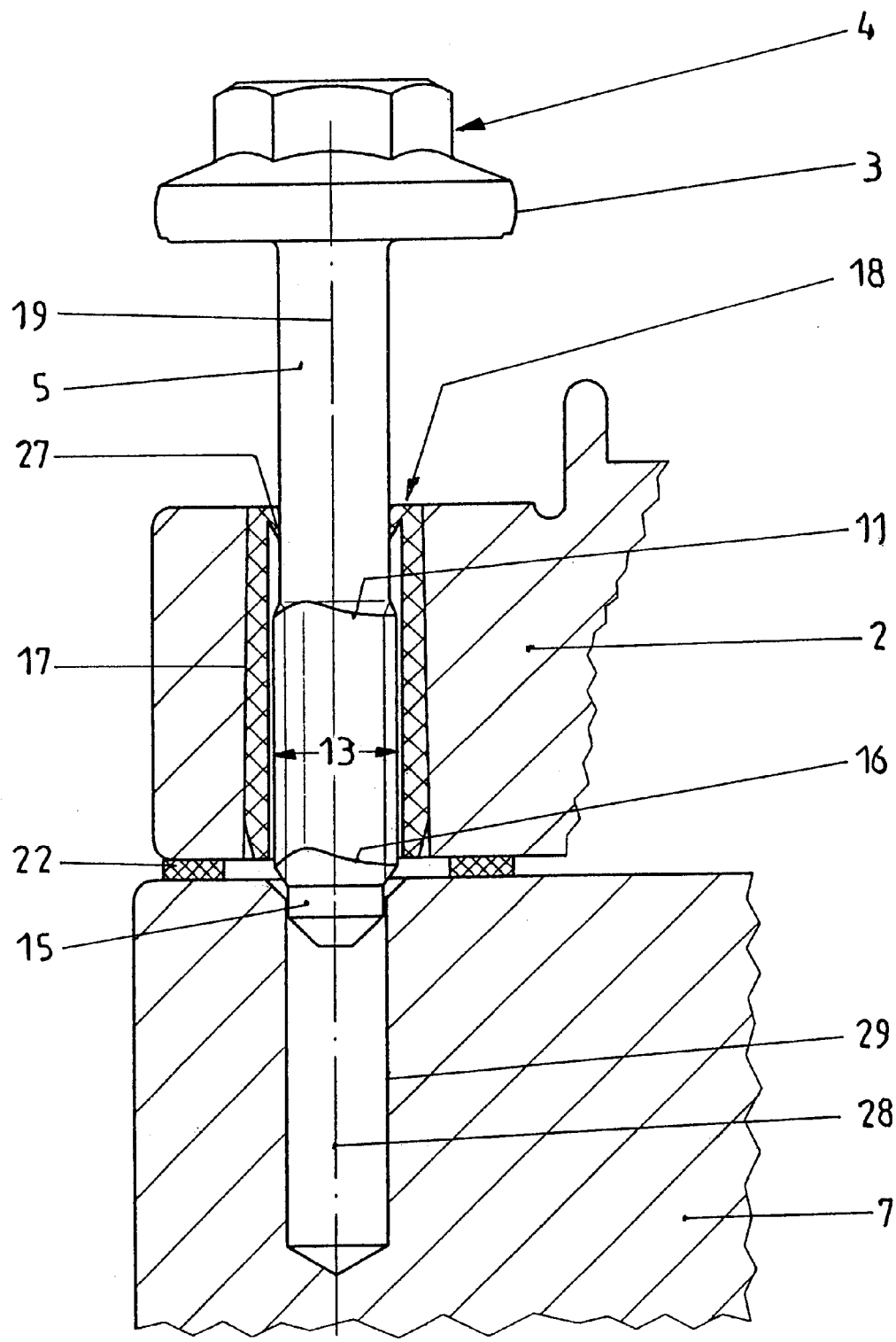
FIG. 4 is a sectional view of a third exemplary embodiment of the novel assembly unit including a screw producing a thread.

The screw 3 includes a head 4 which has a known design for the connection to a torsional tool. The screw 3 further includes a shank 5. The head 4 at the transition to the shank 5 includes a supporting surface 6 which will get in contact to the component 2 during assembly of the assembly unit 1 at the work piece 7. The shank 5 of each screw 3 includes a ring groove 8 which starts from the head 4 and from the supporting surface 6, respectively, and which extends over an axial length 9 of the shank 5. In the illustrated case, the diameter of the ring groove 8 corresponds to the rolling diameter of the shank 5 of the screw 3—including the section of which a thread 10 will be produced. A thread 10 is connected to the ring groove 8. In the illustrated exemplary embodiment, the thread 10 is designed as a metric thread, and it extends more or less over the entire length of the shank 5 close to the ring groove 8. However, the shank 5 in the region of the thread 10 may also have a trilobulare cross section 11, for example (FIG. 4). The cross section 11 is illustrated by a curved line in FIG. 4. The thread 10 at the shank 5 has a root diameter 12 and an outer diameter 13. The flank diameter of the thread 10 is determined according to the equation known in the art. A connecting portion 14 having a conical design may be arranged at the free end of the shank 5. Additionally, a centering connecting element or centering portion 15 may be arranged, as illustrated. Along the length of the shank 5 of the thread 3 which produces a thread (FIG. 4), a portion 16 producing the thread and a smoothening portion are connected to the connecting portion 14.

A through hole 17 is located at a certain place of the component 2. The hole 17 usually is a continuous bore in the component 2. The through hole 17 may also be a continuous bore (FIG. 6) in the component 2. It is to be understood that the component 2 includes such a through hole 17 for each screw at the respective places.

Figure 5:
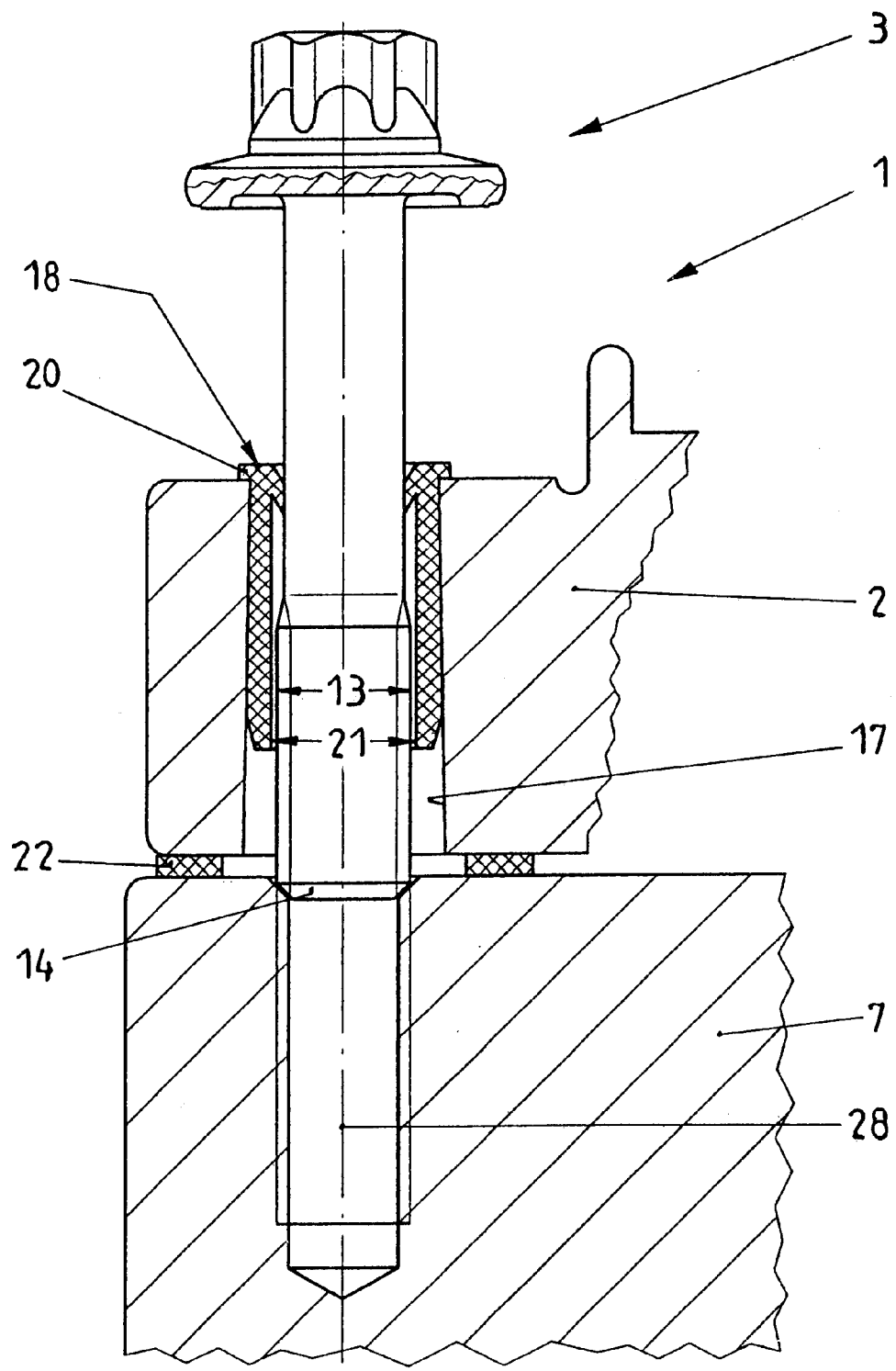
FIG. 5 is a sectional view of a fourth exemplary embodiment of the assembly unit while getting in contact with a work piece.

The through hole 17 in the component 2 may especially be designed not have a round shape. For example, it may have a trilobulare design or a polygon design. It may include a radial recess, or it may also be designed as an elongated hole. All these unround cross sections of the through hole 17 serve to securely support a bush 18, especially without allowing for its rotation. However, it is also sufficient to design the bush 18 to have a cylindrical shape and to also design the through hole 17 to have a cylindrical shape and to press the bush 18 into the through hole 17 in a way that the bush 18 is securely located in the through hole 17 due to frictional engagement. The bush 18 forms a plug-like pre-assembly element, and it serves to support the screw 3 at the component 2 in a way that the axis 19 of the screw 3 in the pre-assembly position is directed approximately at a right angle with respect to the component 2 and to the work piece 7, respectively. The bush 18 may have a greater axial length than the thickness of the component 2. Especially, a collar 20 may be connected to the surface of the component 2 from the outside, and it may form a stop preventing its further insertion or passing through the component 2. At the other side—meaning the side facing the work piece 7—the bush 18 may end at the same place as the through hole 17, or it may even be shorter—as shown in FIG. 5. However, the bush 18 may also protrude beyond the component 2 to a certain extent (not illustrated), and it may there include a protrusion which especially forms an expanding rib. In this way, the bush 18 is fixed in an axial direction towards both directions. The axial excess of the expanding rib is only desired in case this is constructively possible without a negative influence on the pre-stress force, for example in case a seal 22 is located between the component 2 and the work piece 7, the height of the seal 22 being more than the axial excess of the expanding rib at the bush 18. The bush 18 is made of plastic material which is substantially more elastic than sheet metal. For example, this is necessary to compensate mismatch with respect to the center when a plurality of screws 3 is screwed into the work piece 7.

The bush 18 has an inner diameter 21 being only slightly more than the outer diameter 13 of the thread 10. The axial length of the bush 18 approximately corresponds to the thickness of the component 2 such that the screw 3 with its axis 19 is held in a position approximately perpendicular with respect to the surface of the work piece 7, as it is necessary at the beginning of the process of screwing the screw 3 into the work piece 7.

The screw 3 in the region around the shank 5 being surrounded by the supporting surface 6 includes a continuous impression 23 being designed and arranged to support the collar 20 of the bush 18. It is sized in a way that the collar 20 is supported in the impression 23 with sufficient play or clearance in axial and radial directions when the screw is tightened. In this condition (FIG. 2), the impression 23 supports the material of the collar 20 of the bush 18 with a clearance such that there is no negative effect on the transmittance of the axial force by the supporting surface 6 to the component 2. Especially, no plastic material is clamped between the supporting surface 6 and the surface of the component 2 which could lead to setting effects.

A bore 24 having a thread 25 and being coordinated with the screw 3 is located in the work piece 7. The thread 25 is coordinated with the thread 10 of the screw 3. The bore 24 at its top includes a chamfer 26 (FIGS. 1 and 5) which serves to simplify insertion of the centering element 15 into the bore 24 and into the connecting portion 14, respectively.

The bush 18 in the region of the collar 20—at least at its upper end portion—includes inwardly protruding protrusions 27 which may be arranged to be declined with respect to the axis 19. There may be two up to approximately seven protrusions 27 at the inner circumference of the bush 18 in a spaced apart manner. In case soft plastic material is used for the bush 18, the protrusions 27 may also be combined to form a continuous rib.

Pre-assembly of the novel assembly unit including a component 2 and at least one screw 3 with the bush 18 may be conducted in different ways. In a first way of assembly, the bush 18 is securely inserted into the through hole 17 of the component 2. Then, the screw 3 is inserted into the bush 18, and it is pressed in or screwed in approximately as far as it is to be seen in FIG. 1. Consequently, the protrusions 27 of the bush 18 expand in a radial direction, especially when the thread 10 slides with respect to the protrusions 27. Then, the protrusions 27 slightly expand in a radial direction in the region of the ring channel 8, and they hold the screw 3 in each position as soon as the pressing in process has been finished (FIG. 1). The bush 18 keeps the screw 3 with its axis 19 in an aligned way since the inner diameter 21 of the bush 18 is only slightly more than the outer diameter 13 of the thread 10. It is to be understood that the component 2 usually is connected to a plurality of such screws 3. The assembly unit is then transported to the place of assembly, and it is put on the work piece 7, as this is illustrated in an intermediate step in FIG. 1. Then, the screws 3 are screwed in. This may be done at a time or successively. The centering connections 15 get into the bore 24. Due to elasticity of the plastic material of the bushes 18, the screws 3 may yield with respect to one another to a limited extent to compensate offset of the axes 28 of a plurality of bores 24 being located in the work piece 7. The threads 10 then engage the threads 25. At the ending of the screwing procedure, each screw 3 has a relative position, as this is to be seen in FIG. 2. Each screw 3 with its thread 10 has exited from the bush 18 to be free from the bush 18. In this position, the bush 18 does not have a function. The pre-stress force is exclusively transmitted by the connecting surface 6.

During assembly, it is also possible to first bring the bushes 18 into contact with the screws 3, meaning to push them onto the thread 10 and further on into the region of the ring channel 8 at the shank 5. Such units of the screw 3 and the bush 18 may then be pressed into a through hole 7 being located at the component 2. Again, the elastic-plastic flexibility of the plastic material of the bush 18 is used for this step of assembly. Tightening and tensioning is then realized in the same way, as this has already been described above. Finally, an end position occurs, as this is to be seen in FIG. 2.

To locate and adjust the screw 3 in the bush 18 in the component 2 in a fixed manner, the bush 18 has an inner diameter 21 which is only slightly less than the outer diameter 13 of the shank 5 of the screw 3 including the thread 10.

Figure 2:
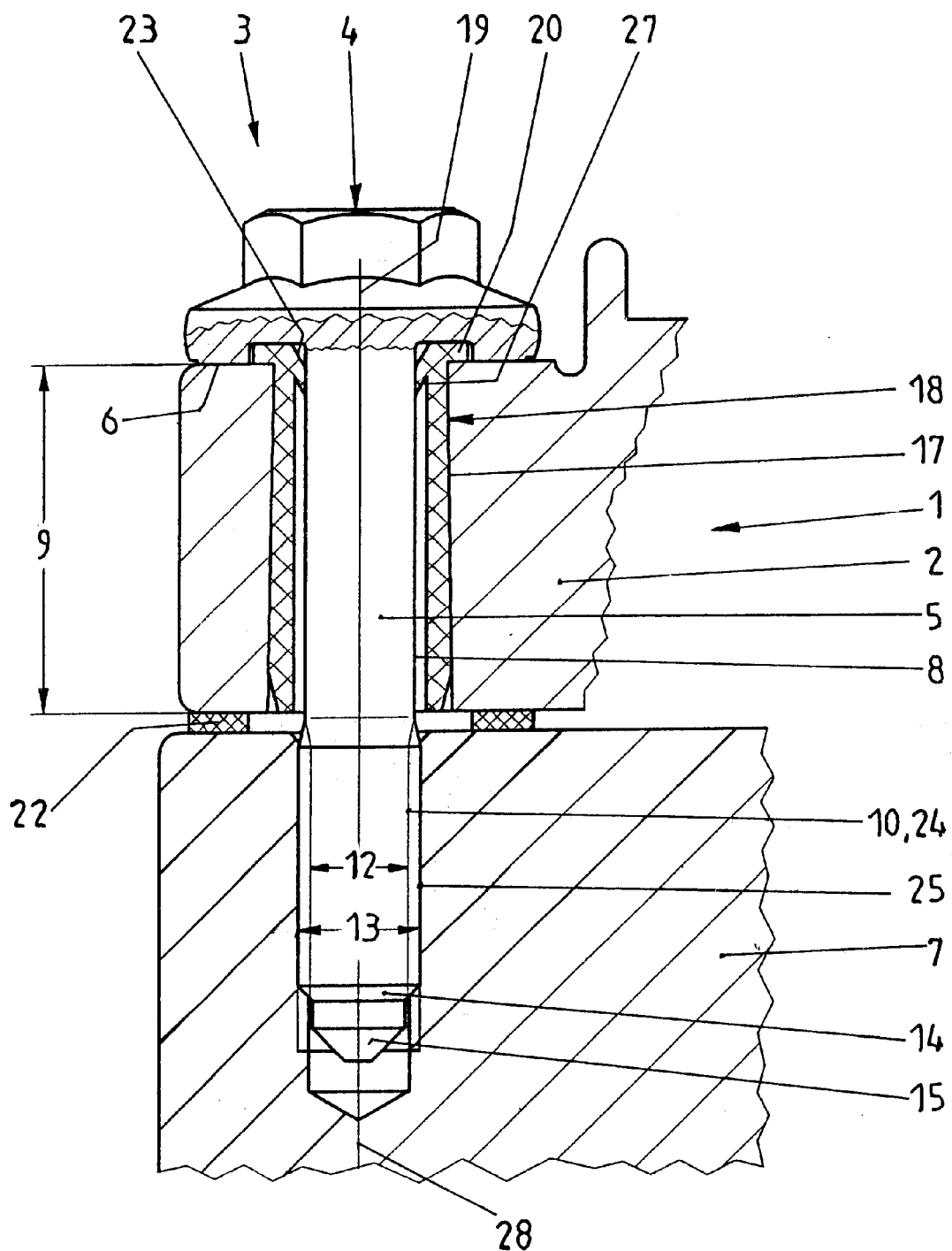
FIG. 2 is a sectional view of a part of the assembly unit according to FIG. 1 after its assembly at the work piece.
Figure 3:
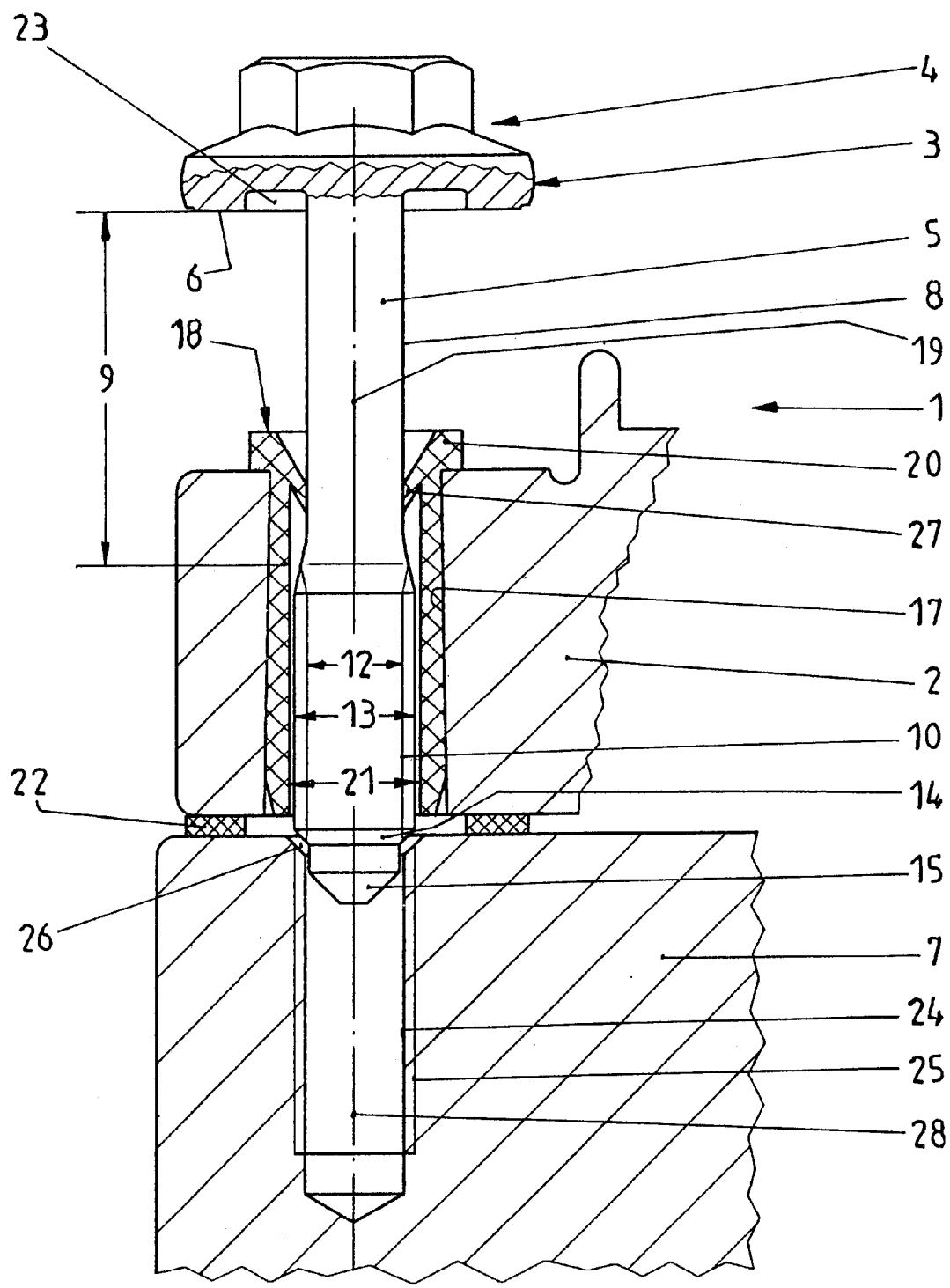
FIG. 3 is a sectional view of a second exemplary embodiment of the novel assembly unit while getting in contact with a work piece.

The exemplary embodiment illustrated in FIG. 3 substantially corresponds to the elements of the embodiment illustrated in FIGS. 1 and 2. Therefore, it is referred to the above description. As a difference, the collar 20 has a height which is more than the height of the deepening 23. During tightening of the screw 3 while screwing it into the work piece 7, the collar 20 of the bush 18 is pressed together in an axial direction such that a sealing effect is attained at this place. Only a small portion of the axial force is consumed. Great portions of the length of the bush remain free from influences of the axial force. Furthermore, the ring channel 8 has a diameter which is less than the rolling diameter of the shank 5 in the region of the thread 10. The diameter of the ring channel 8 may even be less than the core diameter of the thread 10. In this way, screwing over may be realized which allows for comparatively deep screwing in.

FIG. 4 illustrates another exemplary embodiment of the novel assembly unit 1. The assembly unit 1 is mostly similar to the embodiment of FIGS. 1 to 3. Therefore, it is referred to the above description. As a difference, the thread 10 of the screw 4 is not designed as a metric thread, but as a thread producing thread 10 having a trilobulare cross section 11. Consequently, a simple bore 29 is located in the work piece 7, the screw 4 automatically producing its thread when the screw 4 is screwed into the bore 29. In the illustrated embodiment, the bush 18 does not include a collar 20, but protrusions 27. The axial length of the bush 18 corresponds to the thickness of the component 2. There is no expanding rib at the lower end of the bush 18. Consequently, such a bush is especially suitable to be pressed into the through hole 17 of the component 2 in an axial direction in the assembled position together with a screw 3.

The exemplary embodiment illustrated in FIG. 5 is similar to the one illustrated in FIGS. 1 and 2. As a difference, the bush 18 has a shorter axial length, and it ends within the through hole 17. The lower end of the bush 18 is located with respect to a position of the shank 5 of the screw 3 carrying the thread 10. Since the inner diameter 21 of the bush 18 is only slightly more than the outer diameter 13 of the thread 10, there is an aligning effect with respect to the axis 19 of the screw 3. This aligning effect is sufficient to first insert the screw 3 and to center it, respectively, although there is no centering connection 15 at the screw 3. The height of the collar 20 approximately corresponds to the height and the depth, respectively, of the deepening 23.

Figure 6:
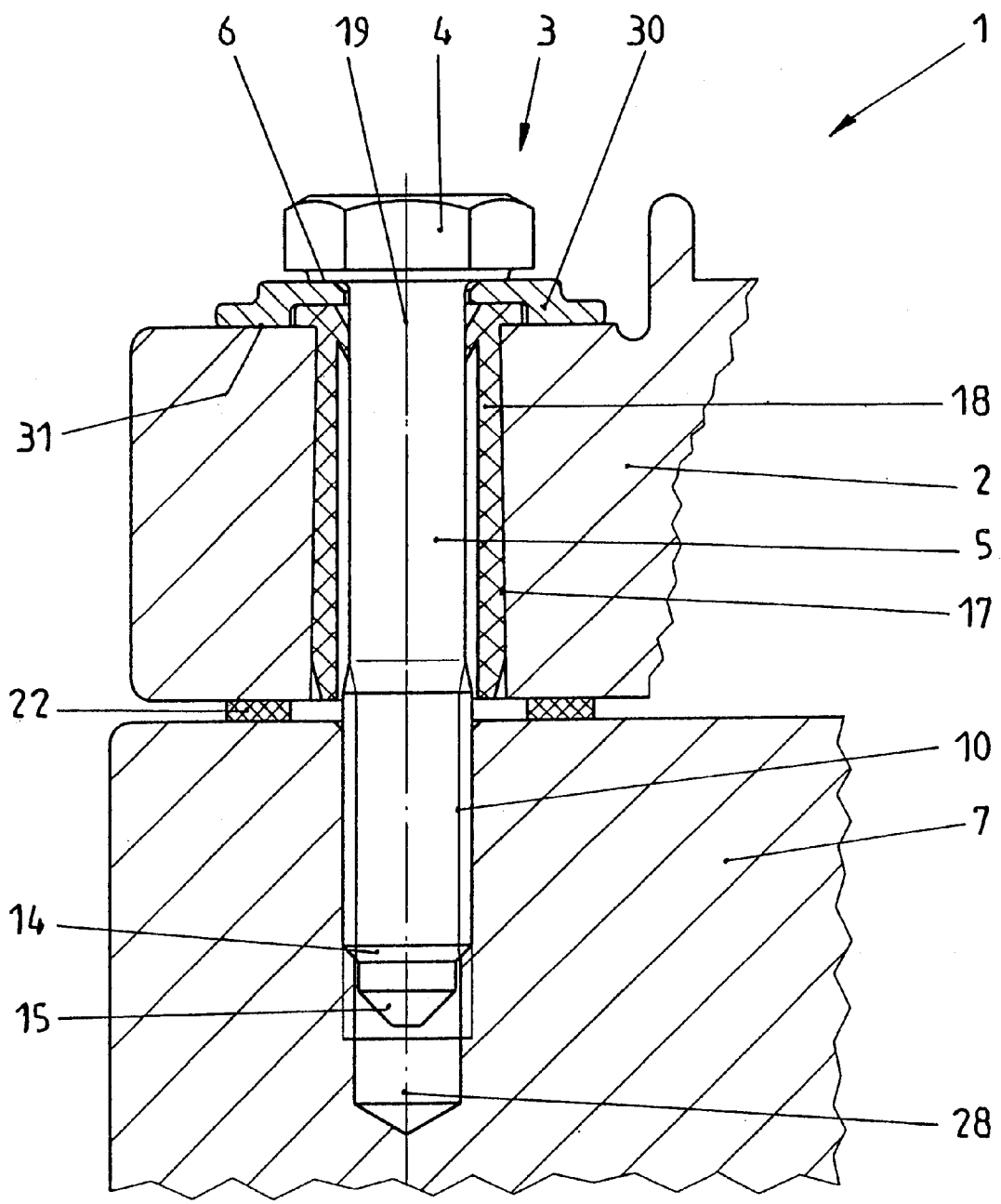
FIG. 6 is a sectional view of another exemplary embodiment of the novel assembly unit after its assembly at the work piece.

The exemplary embodiment illustrated in FIG. 6 is basically similar to the one of FIGS. 1 and 2. As a difference, the novel assembly unit 1 includes a fourth element. The fourth element is a supporting disc 30. The inserted screw 3 has a usual design—meaning it does not include a deepening 23, but rather a continuous supporting surface 6. The supporting disc 30 has a Z-like cross section. Consequently, a comparatively increased supporting surface 31 at the component 2 results. Nevertheless, during tightening of the screw, there is an advantageously low head frictional moment. The supporting disc 30 may be captively arranged on the shank 5 of the screw 3. For example, it may be held by the rolled thread 10, the thread 10 being produced after putting the supporting disc 30 onto the shank 5 of the screw 3. It is to be seen that the supporting disc 30 may also be designed to be one piece together with the screw 3, as this is illustrated in FIG. 1.

FIGS. 7 through 14 illustrate a variety of different exemplary embodiments of the bush 18.

Figure 7:
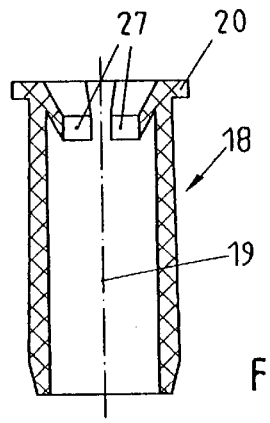
FIG. 7 is a vertical sectional view through an exemplary embodiment of the bush.
Figure 8:
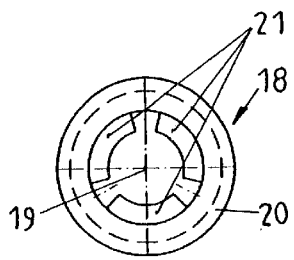
FIG. 8 is a top view of the bush according to FIG. 7.

The bush 18 according to FIGS. 7 and 8 includes three protrusions 27 being uniformly spaced apart about the circumference. The protrusions 27 separately protrude towards the inside from the inner diameter 21 of the bush 18. The inclined or declined arrangement of the protrusions 27 is to be well seen from the Figures. The collar 20 extends outwardly in a radial direction. The collar 20 and the protrusions 27 are located in an adjacent way in the upper region of the bush 18.

Figure 9:
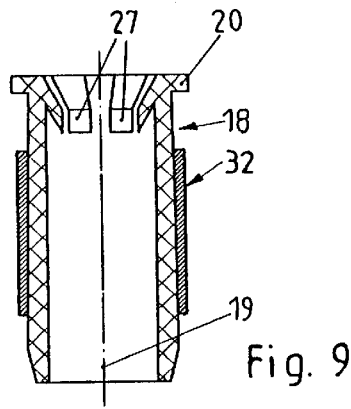
FIG. 9 is a vertical sectional view through another exemplary embodiment of the bush.
Figure 10:
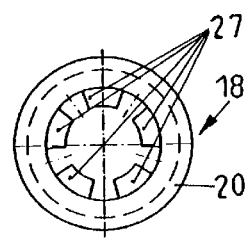
FIG. 10 is a top of the bush according to FIG. 9.

The bush 18 according to FIGS. 9 and 10 includes five protrusions 27 being uniformly distributed about the circumference. The protrusions 27 are arranged to separately protrude towards the inside from the inner diameter 21 of the bush 18. The bush 18 at a part of its axial length includes a glue layer or cover 32.

Figure 11:
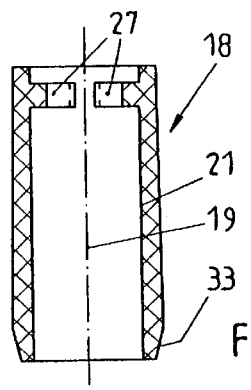
FIG. 11 is a vertical sectional view through another exemplary embodiment of the bush.
Figure 12:
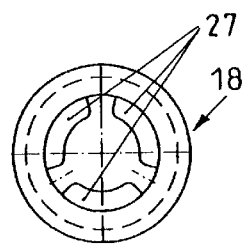
FIG. 12 is a top view of the bush according to FIG. 11.

The bush 18 according to FIGS. 11 and 12 also includes three protrusions 27 being uniformly distributed about the circumference. The protrusions 27 are arranged to separately protrude towards the inside in a radial direction from the inner diameter 21 of the bush 18. In this embodiment, there is no collar 20. The protrusions 27 are arranged slightly above the upper end of the bush 18. An insertion chamfer 33 simplifies pressing the bush 18 into the through hole 17 being located in the component 2.

Figure 13:
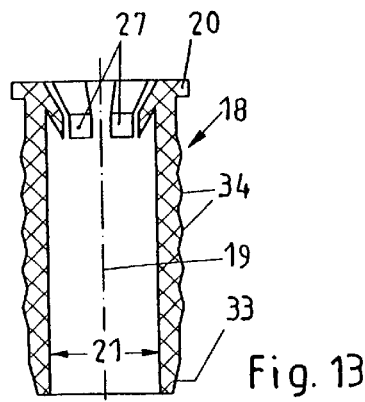
FIG. 13 is a vertical sectional view through another exemplary embodiment of the bush.
Figure 14:
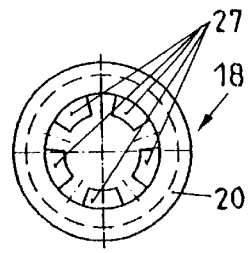
FIG. 14 is a top view of the bush according to FIG. 13.

The bush 18 according to FIGS. 13 and 14 includes five protrusions 27 being uniformly distributed about the circumference. The protrusions 27 separately protrude towards the inside from the inner diameter 21 of the bush 18. The bush 18 at its outer circumference includes swellings 34. The swellings 34 serve to attain a secure position of the bush 18 pressed into the in through hole 17.

The bush 18 at its outer diameter may be slightly bigger than the through hole 17 to have a positive effect on the secure fit after pressing the bush 18 into the through hole 17 to attain support by frictional engagement without allowing for rotation. However, it is also possible to fixedly connect the bush 18 in the through hole 17 by a glue means or the like. However, usually such special arrangements are not necessary.

Many variations and modifications may be made to the preferred embodiments of the invention without departing substantially from the spirit and principles of the invention. All such modifications and variations are intended to be included herein within the scope of the present invention, as defined by the following claims.

We claim:

1. An assembly unit, comprising:
    at least one component;
    at least one screw including a shank having an outer diameter and at least partially including a thread, a head being designed and arranged to rotate said screw and a supporting surface facing said component,
        said component for each screw including a through hole having a diameter; and
    at least one bush having an outer diameter and an inner diameter, being associated with said at least one screw and being designed and arranged to be insertable into said respective through hole, said bush being made of plastic material and being designed and arranged to be fixedly connected in said through hole resulting in elastic deformation of said bush, the inner diameter of said bush being slightly more than the outer diameter of said shank, said bush at its side facing said head of said screw including a collar protruding in an outward direction, said collar being designed and arranged to limit the capability of pressing said bush into said through hole of said component,
        said supporting surface being designed and arranged to operatively contact said component after assembly without contacting said bush to transmit an axial force, and
        said bush, said screw and said component being designed and arranged to be captively connected.

2. The assembly unit of claim 1, wherein said bush has a length and said screw in the region of its shank close to said supporting surface includes a ring groove forming an undercut, said ring groove having a diameter which is less than the inner diameter of said bush and an effective axial length which is more than the length of said bush.

3. The assembly unit of claim 1, wherein said bush is fixedly connectable in said through hole due to frictional engagement.

4. The assembly unit of claim 1, wherein said bush is fixedly connectable in said through hole due to form fit.

5. The assembly unit of claim 1, wherein said bush is fixedly connectable in said through hole due to frictional engagement and due to form fit.

6. The assembly unit of claim 1, wherein said supporting surface is designed and arranged to directly contact said component after assembly without contacting said bush to transmit an axial force.

7. The assembly unit of claim 1, wherein said supporting surface is designed and arranged to indirectly contact said component after assembly without contacting said bush to transmit an axial force.

8. The assembly unit of claim 1, wherein said bush is designed as a preform element made of plastic material.

9. The assembly unit of claim 1, wherein said screw includes an impression being designed as a continuous yielding channel, said impression being arranged close to said supporting surface and being designed and arranged to prevent clamping of material of said bush during tightening of said screw and to accommodate said collar.

10. The assembly unit of claim 9, wherein said impression has an axial length being less than the axial length of said collar to attain a sealing effect in the tightened position of said assembly unit.

11. The assembly unit of claim 1, wherein said thread has an axial length being less than the thickness of said component.

12. The assembly unit of claim 1, wherein said shank of said screw has a free end at which a centering element is arranged, said centering element including no thread and having a smaller outer diameter than the inner diameter of said bush.

13. The assembly unit of claim 1, wherein said bush has a greater height than said component in the region of said through hole.

14. The assembly unit of claim 13, wherein said collar is designed and arranged to protrude beyond said through hole in a radial direction.

15. An assembly unit comprising:
    at least one component;
    at least one screw including a shank having an outer diameter and at least partially including a thread, a head being designed and arranged to rotate said screw and a supporting surface facing said component,
        said component for each screw including a through hole having a diameter; and
    at least one bush having an outer diameter and an inner diameter, being associated with said at least one screw and being designed and arranged to be insertable into said respective through hole, said bush being made of plastic material and being designed and arranged to be fixedly connected in said through hole resulting in elastic deformation of said bush, the inner diameter of said bush being slightly more than the outer diameter of said shank, said bush at its side facing said head of said screw including at least one protrusion protruding in an outward direction, said protrusion being designed and arranged to limit the capability of pressing said bush into said through hole of said component,
        said supporting surface being designed and arranged to operatively contact said component after assembly without contacting said bush to transmit an axial force, and
        said bush, said screw and said component being designed and arranged to be captively connected.

16. The assembly unit of claim 15, wherein said bush at its side facing said head of said screw includes a plurality of protrusions being directed in an inclined inward direction and being designed and arranged to be elastically deformable.

17. The assembly unit of claim 16, wherein each of said protrusions includes a chamfer for easier insertion of said screw.

* * * * *